US012565438B2

(12) United States Patent
Anderson et al.

(10) Patent No.: US 12,565,438 B2
(45) Date of Patent: Mar. 3, 2026

(54) MULTIPLE GOB FEEDER, GOB FEEDING METHOD AND RELATED SYSTEM, AND FEEDER ORIFICE

(71) Applicant: Owens-Brockway Glass Container Inc., Perrysburg, OH (US)

(72) Inventors: Walter Anderson, Maumee, OH (US); Javier Reyes, Perrysburg, OH (US); John Holmes-Libbis, Perrysburg, OH (US); Bernhard Altendorfer, Waldkirchen (DE); Alexandra Fuller, Neuburg am Inn (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 328 days.

(21) Appl. No.: 18/114,251

(22) Filed: Feb. 25, 2023

(65) Prior Publication Data

US 2023/0271868 A1      Aug. 31, 2023

Related U.S. Application Data

(60) Provisional application No. 63/313,983, filed on Feb. 25, 2022.

(51) Int. Cl.
| | |
|---|---|
| *C03B 7/088* | (2006.01) |
| *C03B 7/092* | (2006.01) |
| *C03B 7/096* | (2006.01) |

(52) U.S. Cl.
CPC .............. *C03B 7/088* (2013.01); *C03B 7/092* (2013.01); *C03B 7/096* (2013.01)

(58) Field of Classification Search
CPC .................................. C03B 7/08; C03B 7/088
See application file for complete search history.

(56) References Cited

U.S. PATENT DOCUMENTS

| | | | |
|---|---|---|---|
| 1,507,852 A | 9/1924 | Pleukharp et al. | |
| 1,684,064 A | 9/1928 | Miller | |
| (Continued) | | | |

FOREIGN PATENT DOCUMENTS

| | | |
|---|---|---|
| DE | 1069345 B | 5/1960 |
| DE | 4124390 A1 | 2/1992 |
| (Continued) | | |

OTHER PUBLICATIONS

Translation of JP H10-231127 (Year: 1998).*

(Continued)

*Primary Examiner* — Cynthia Szewczyk

(57)      ABSTRACT

A method of loading glass gobs into blank molds includes producing glass gobs falling from laterally spaced orifices along falling gob axes, and receiving the glass gobs into laterally spaced blank molds having blank mold centerlines corresponding to the falling gob axes. A related system is disclosed. Also disclosed is a multiple gob feeder that includes a feeder vessel including outlets with outlet centerlines, and feeder orifices in communication with the feeder vessel and having orifice centerlines coaxial with the outlet centerlines of the outlets of the feeder vessel and establishing gob falling axes and including orifice pipes and orifice tips below the orifice pipes. The orifice pipes include heaters to heat the orifice pipes and the orifice tips include orifice tip heaters to heat the orifice tips.

19 Claims, 7 Drawing Sheets

(56) References Cited

U.S. PATENT DOCUMENTS

| | | | |
|---|---|---|---|
| 2,569,459 | A | 10/1951 | De Voe |
| 2,570,079 | A | 10/1951 | Spremulli |
| 2,926,208 | A | 2/1960 | Eden |
| 3,393,989 | A | 7/1968 | Strausbaugh |
| 3,419,373 | A * | 12/1968 | Gould .................... C03B 7/086 |
| | | | 65/129 |
| 3,552,942 | A | 1/1971 | Trudeau |
| 3,554,726 | A | 1/1971 | Daly |
| 3,787,196 | A | 1/1974 | Becker et al. |
| 4,581,054 | A | 4/1986 | Mumford |
| 4,592,770 | A | 6/1986 | Pearman et al. |
| 5,738,701 | A | 4/1998 | Ikeuchi et al. |
| 6,477,862 | B1 * | 11/2002 | Wacke .................... C03B 9/165 |
| | | | 65/159 |
| 7,134,301 | B2 | 11/2006 | Meyer et al. |
| 8,485,717 | B2 | 7/2013 | Adelsberg et al. |
| 9,212,078 | B2 | 12/2015 | Bratton et al. |
| 10,865,132 | B2 | 12/2020 | Ding et al. |
| 2009/0025428 | A1 | 1/2009 | Naumann et al. |
| 2009/0223251 | A1 * | 9/2009 | Tomisaka ............ C03B 19/1005 |
| | | | 65/142 |
| 2014/0000317 | A1 * | 1/2014 | Kuz ........................ C03B 7/005 |
| | | | 65/164 |
| 2019/0292085 | A1 | 9/2019 | Retorick et al. |

FOREIGN PATENT DOCUMENTS

| | | | | |
|---|---|---|---|---|
| DE | 202004003030 | U1 | 7/2004 | |
| EP | 0133775 | A2 | 3/1985 | |
| EP | 3604238 | A1 | 2/2020 | |
| JP | H10231127 | A * | 9/1998 | ............. C03B 7/092 |
| JP | 3707818 | B2 | 10/2005 | |
| JP | 3817363 | B2 | 9/2006 | |
| JP | 4211427 | B2 | 1/2009 | |
| JP | 4265084 | B2 | 5/2009 | |
| WO | 2023081385 | A1 | 5/2023 | |

OTHER PUBLICATIONS

Int. Search Report and Written Opinion, Int. Application No. PCT/US2023/013900, Applicant: Owens-Brockway Glass Container Inc, Date: Jul. 24, 2023.

Informe de Busqueda (Search Report), Application No. 202401859, Applicant: Owens-Brockway Glass Container Inc., Dated: Jul. 30, 2025.

Informe Pericial (Expert Report), Application No. 202401859, Applicant: Owens-Brockway Glass Container Inc., Dated: Jul. 30, 2025.

* cited by examiner

MULTIPLE GOB FEEDER, GOB FEEDING METHOD AND RELATED SYSTEM, AND FEEDER ORIFICE

TECHNICAL FIELD

This patent application discloses innovations related to glass container manufacturing and, more particularly, to glass gob feeders and loading of glass gobs from gob feeders into blank molds.

BACKGROUND

Soda-lime-silica glass and other types of glass are prevalent in the manufacture of glass containers. Molten glass used to make such articles can be conventionally prepared by reacting and melting a batch of glass-forming materials in a glass furnace. The batch of glass-forming materials is typically introduced into the furnace by being deposited into a pool of molten glass already in the furnace. In a conventional furnace, the batch is gradually melted into the pool by continuous application of heat. In a submerged combustion (SC) melting furnace, the batch is melted by injecting a combustible gas mixture that contains fuel and oxygen directly into the pool contained in a SC melter, typically though submerged burners mounted in the floor or in an immersed portion of the sidewalls of the melter. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the molten glass compared to the slower kinetics of a conventional melting furnace.

After the batch has been melted within the furnace, the resulting molten glass is typically directed to a fining channel where bubbles are liberated from the molten glass and then downstream to a forehearth where the fined molten glass is thermally conditioned by being cooled to a suitable temperature for forming the molten glass into containers. A gob feeder located at a downstream end of the forehearth can be used to measure out and form predetermined amounts of molten glass known as "gobs." The gob feeder usually includes two or more orifices through which gobs are fed down into and through "delivery" equipment, and to an "individual section" (IS) machine that usually includes two or more blank molds that form the glass gobs into parisons used to form glass containers.

The gob feeder typically controls the temperature and quantity of molten glass of the glass gobs and a rate at which the glass gobs are fed to the IS machine indirectly via the delivery equipment. But the delivery equipment requires use of lubricants and includes a complex arrangement of scoops, troughs, and deflectors of varying lengths and configurations, depending on proximity of each section of the IS machine to the gob feeder. The use of lubricants and variable delivery equipment contributes to variation in temperature distribution of the glass gobs, which can contribute to undesirable non-uniform wall thicknesses of glass containers produced from the glass gobs. Such non-uniformity necessitates use of container wall thicknesses that are greater than would otherwise be required.

SUMMARY OF THE DISCLOSURE

The present disclosure embodies a number of aspects that can be implemented separately from or in combination with each other.

A glass feeding and forming system in accordance with one aspect of the disclosure includes a multiple gob feeder including feeder orifices laterally spaced apart from one another and having longitudinal orifice centerlines establishing gob falling axes. The system also includes a blank molding station disposed below the gob feeder and including blank molds laterally spaced apart from one another and having longitudinal blank mold centerlines establishing gob loading axes corresponding to the gob falling axes of the gob feeder.

In accordance with another aspect of the disclosure, there is provided a multiple gob feeder including a feeder vessel including outlets laterally spaced apart from one another and with outlet centerlines, and feeder orifices laterally spaced apart from one another and in communication with the feeder vessel and having orifice centerlines coaxial with the outlets of the feeder vessel and establishing gob falling axes. The feeder orifices include orifice pipes having pipe mounts, and pipe sleeves carried by the pipe mounts. The feeder orifices also include orifice tips having tip mounts mounted to the pipe mounts, and tip sleeves carried by the tip mounts.

In accordance with a further aspect of the disclosure, there is provided a multiple gob feeder including a feeder vessel including outlets with outlet centerlines, feeder orifices in communication with the feeder vessel and having orifice centerlines coaxial with the outlets of the feeder vessel and establishing gob falling axes. The feeder orifices include orifice pipes including orifice pipe sleeves and orifice pipe heaters to heat the orifice pipes. The feeder orifices also include orifice tips including orifice tip sleeves and orifice tip heaters to heat the orifice tips.

In accordance with an additional aspect of the disclosure, there is provided a method of loading glass gobs into a blank molding station of a glass forming machine. The method includes producing glass gobs falling from orifices laterally spaced apart from one another and along falling gob axes, and receiving the glass gobs into blank molds laterally spaced apart from one another and having blank mold centerlines corresponding to the falling gob axes.

In accordance with another aspect of the disclosure, there is provided a glass gob feeder orifice that includes an orifice pipe including an orifice pipe sleeve, a refractory collar around the orifice pipe sleeve, and an orifice pipe heater to heat the orifice pipe. The glass gob feeder orifice also includes an orifice tip below the orifice pipe and including an orifice tip sleeve, and an orifice tip heater to heat the orifice tip.

DETAILED DESCRIPTION

Figure 1:
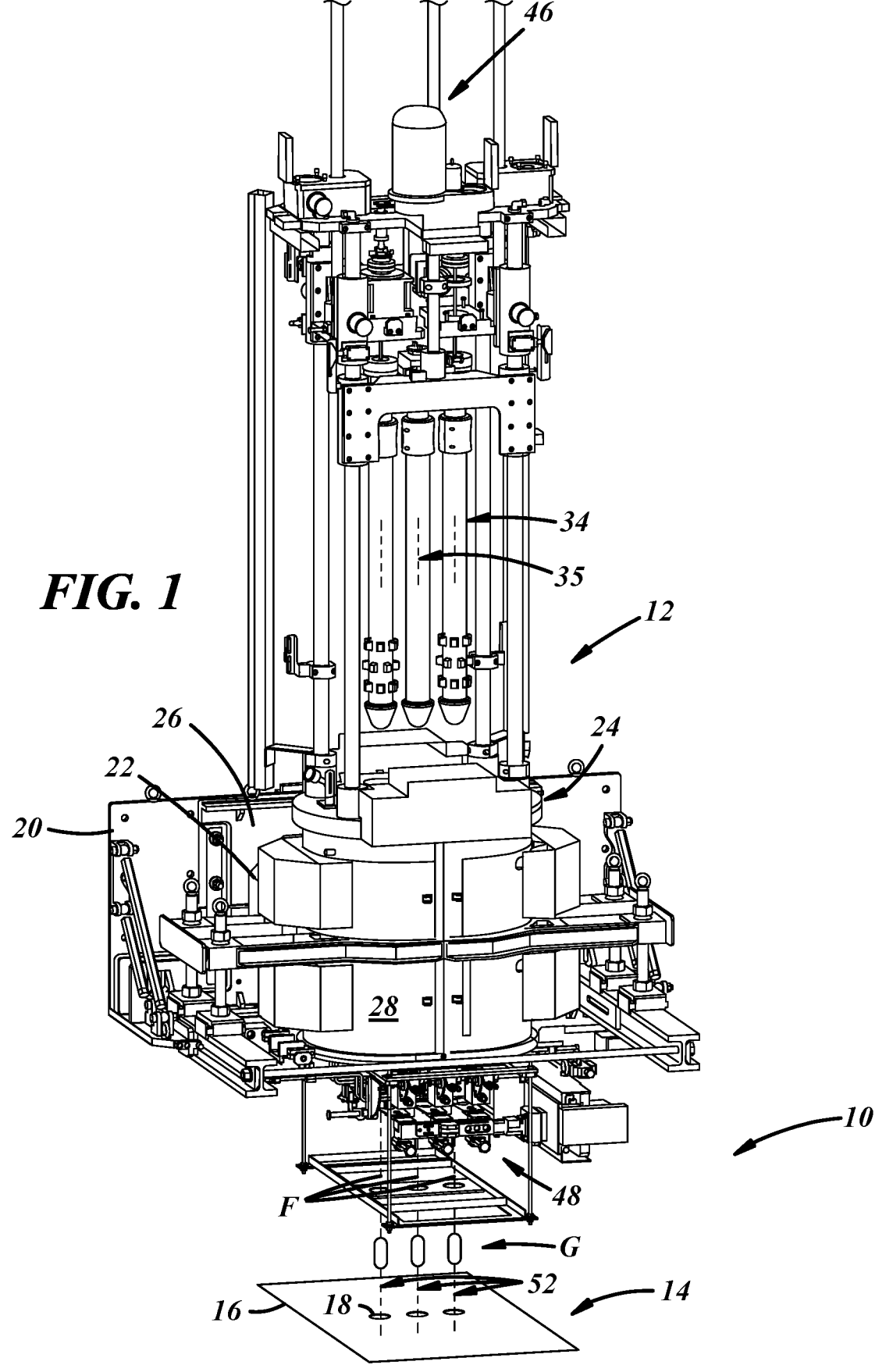
FIG. 1 is a perspective schematic view of a glass feeding and forming system in accordance with an illustrative embodiment of the present disclosure, illustrating a glass gob feeder and a glass forming machine.

In general, and in accordance with at least one aspect of the present disclosure, an apparatus, system, and method are provided for loading a glass gob directly into at least one blank mold, preferably with no intervening delivery equipment in the form of scoops, troughs, and/or deflectors to move gobs from feeder centerlines inward or outward to blank mold centerlines. But such delivery equipment could be used, for example, to provide equal paths for gobs traveling to blank molds. Therefore, the apparatus, system, and method do not necessitate delivery equipment that requires lubrication and that is lengthy and involves prolonged contact between glass gobs and the delivery equipment, and thus do not require a large height difference between the glass feeder and the corresponding blank mold (s). As such, the temperature distribution of each glass gob delivered from the glass feeder to the blank mold(s) is more uniform thereby leading to more uniform wall thicknesses of glass containers produced from the glass gobs and, thus, thinner-walled lighter-weight containers can be produced. In accordance with another aspect of the present disclosure, a feeder orifice is heated to facilitate rapid temperature changes of the orifice for good weight control of gobs, and is of split configuration to heat an orifice tip to a higher temperature than an orifice pipe to prevent freezing of glass at the orifice tip and prevent concomitant undesired reduction in gob diameters at the orifice tip. The orifice is configured with a plurality of interchangeable tip sleeves having conduits of differently sized inner diameters to facilitate easy change out from one gob size to another.

With specific reference to the drawing figures, FIG. 1 generally shows an illustrative embodiment of a glass feeding and forming system 10 that includes a multiple gob feeder 12 to produce a plurality of glass gobs G that fall along respective gob falling axes F corresponding to the gobs G, and a glass forming machine 14 below the gob feeder 12 to receive or load the falling gobs G and ultimately produce glass containers (not shown) from the glass gobs G. The glass forming machine 14 may be an individual section (IS) machine having a blank molding station or blank side 16 with a plurality of blank molds 18 to form glass blanks or parisons from the glass gobs G, and a blow side (not shown) with a plurality of blow molds (not shown) to form glass containers from the glass blanks or parisons after the blanks or parisons are transferred from the blank molds 18 to their corresponding blow molds. In other embodiments, the glass forming machine 14 may include any suitable equipment to produce glass blanks or parisons.

Preferably, the system 10 includes no gob delivery equipment in the form of scoops, troughs, and/or deflectors between the gob feeder 12 and the blank molds 18 to change direction of the falling gobs G away from their gob falling axes F. However, the blank side 16 may include gob funnels (not shown) that may be placed at an elevation about 2 mm or more above baffle matches of the blank molds 18 between the gob feeder 12 and the blank molds 18. Notably, a primary purpose of a gob funnel is to maintain a trajectory of a falling gob along a falling gob axis. The gob funnel does not redirect the glass gob away from the gob falling axis associated with its blank mold.

According to the present disclosure, a loading height between a glass line (or "metal line") of a glass melting apparatus and a top of a blank mold machine bed can be reduced compared to conventional arrangements using delivery equipment in the form of scoops, troughs, and/or deflectors. Such conventional equipment typically requires a conventional loading height of about 6 meters to achieve a gob velocity sufficient to fully load a gob into a blank mold. In contrast, because there is little to no surface contact on gobs falling between the gob feeder 12 and the blank molds 18 according to the present disclosure, the gobs G can achieve velocity sufficient to fully load the gobs G into the blank molds 18 according to a reduced loading height of, for example, about 3 meters. As used herein, the term "about" means within plus or minus 15%. In other embodiments, the presently disclosed subject matter can be used to direct load blank molds 18 at conventional heights. Notably, the shape of the gobs G for direct loading is substantially different than gobs loaded into molds via conventional delivery equipment, because there is little to no stretching of the gobs G thru any delivery equipment.

With continued reference to FIG. 1, the gob feeder 12 may include a base mounting plate 20 that may be mounted to a downstream end of a source of conditioned molten glass, such as a forehearth (not shown). The base mounting plate 20 may be used to mount a feeder channel 22 in communication with the forehearth (not shown) to receive molten glass therefrom, and a feeder head or spout 24 in communication with the feeder channel 22, via a secondary mounting plate 26 coupled to the base mounting plate 20, and also may be used to mount various other devices, equipment, beams, gussets, tension straps, and the like of the gob feeder 12. The spout 24 is in downstream fluid communication with the forehearth and the feeder channel 22, and may include a housing 28 that may be mounted to the secondary mounting plate 26 via frames, beams, or the like welded, fastened, or otherwise coupled to the plate 26 and coupled to the spout 24 directly or via cross-members, fasteners, and the like.

Figure 2:
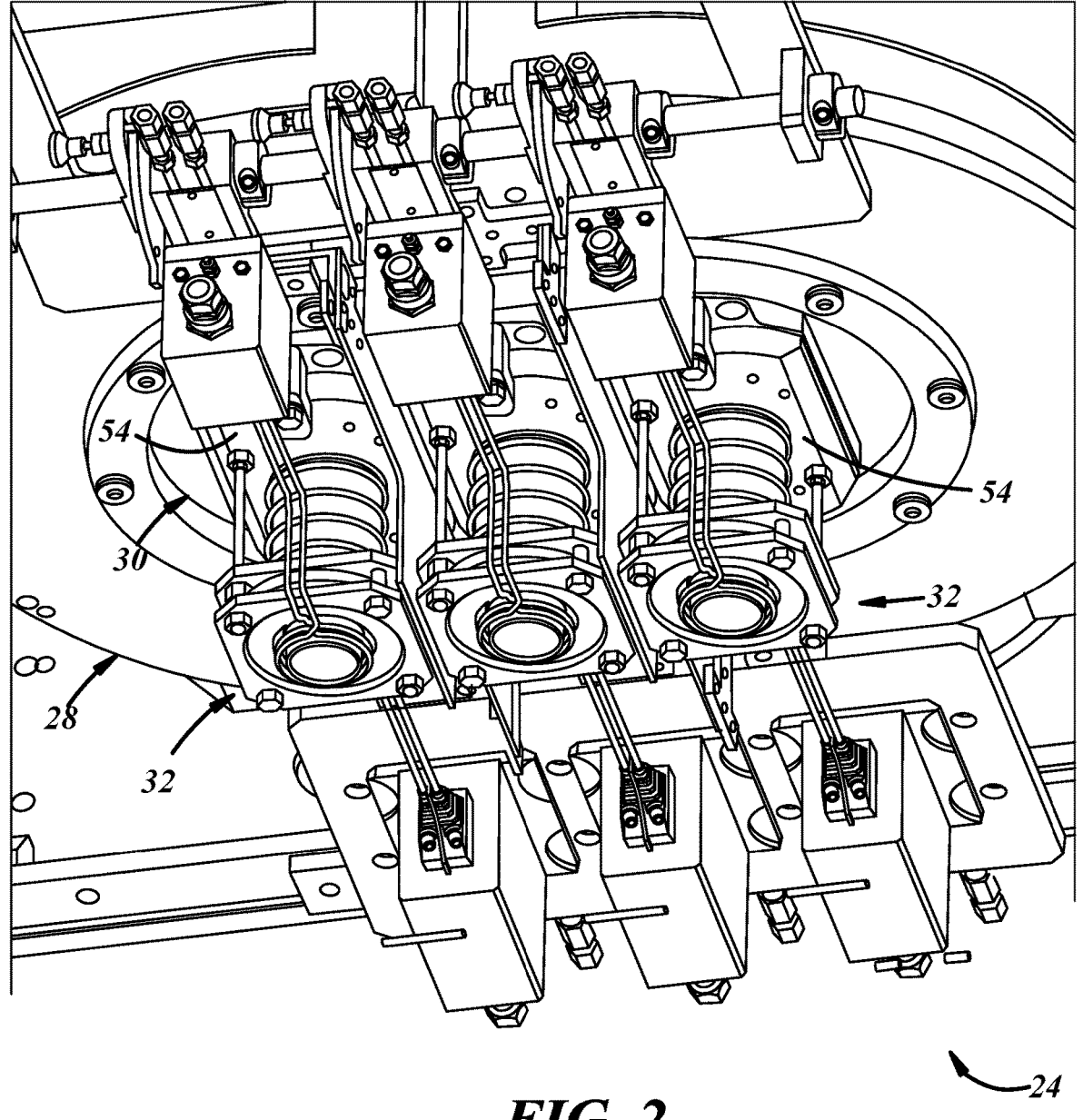
FIG. 2 is an enlarged, fragmentary, perspective view of a lower portion of the glass gob feeder shown in FIG. 1 and illustrating split induction-heated orifices.
Figure 3:
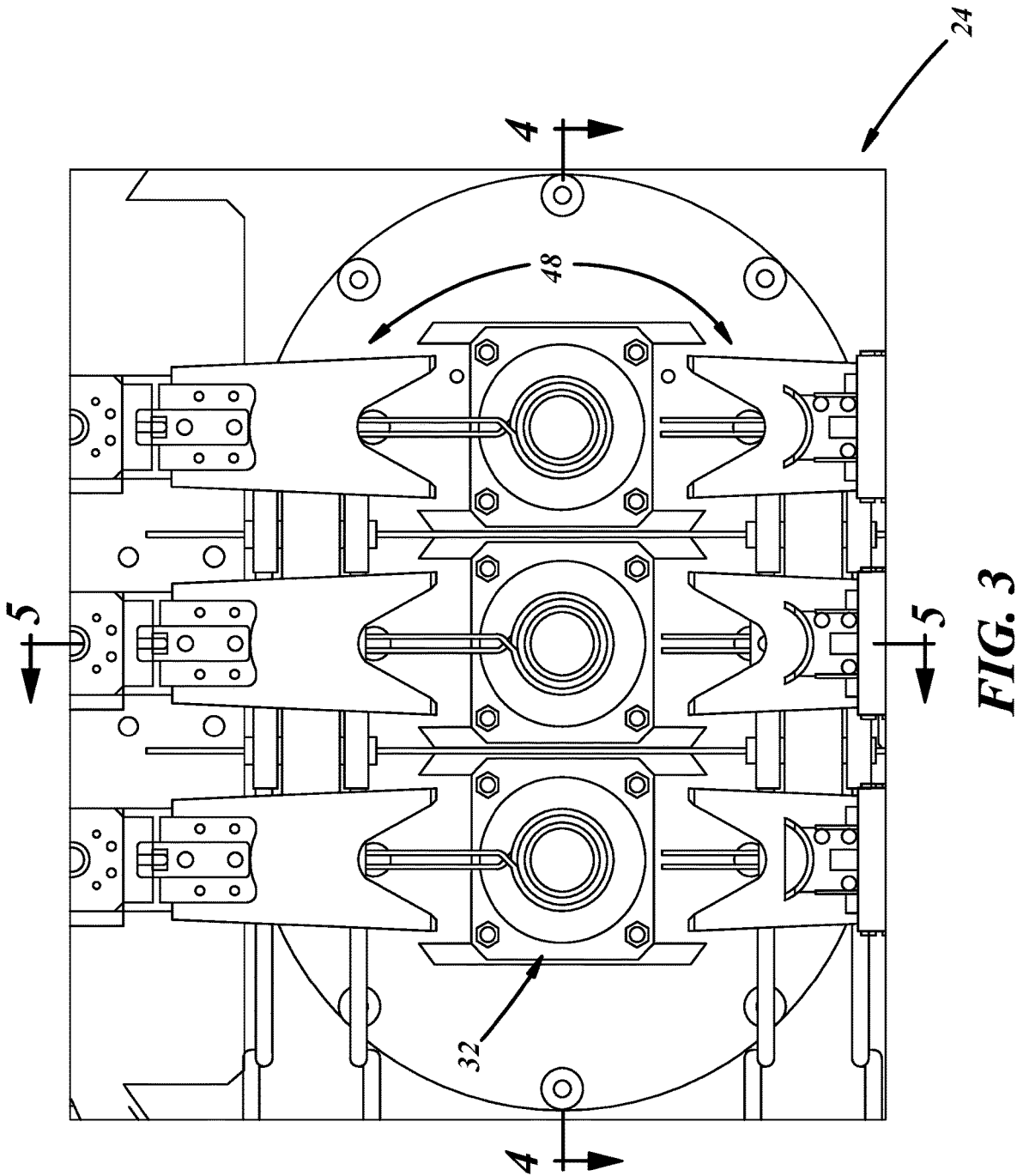
FIG. 3 a fragmentary orthogonal bottom view of the feeder shown in FIG. 2 and illustrating the orifices and gob cutting shears.

With reference now to FIGS. 2 and 3, the spout 24 also may include a feeder vessel 30 carried by the housing 28 to receive the molten glass, and feeder orifices 32 below the feeder vessel 30. The feeder orifices 32 may be heated orifices, for example, split induction-heated orifices, and are in molten glass communication with the feeder vessel.

Figure 4A:
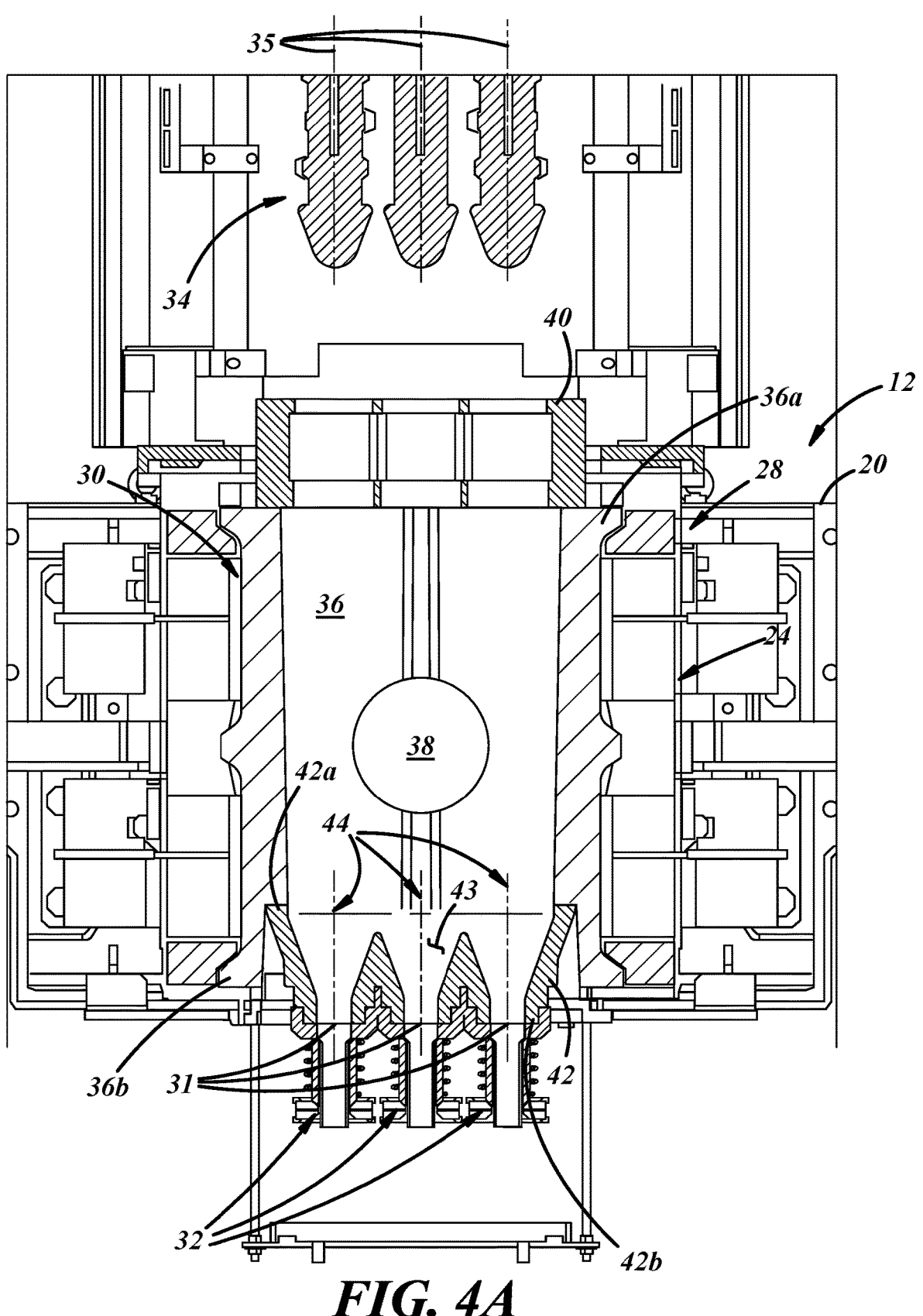
FIG. 4A is a fragmentary cross-sectional view of the system of FIG. 1, taken along line 4-4 of FIG. 3 and illustrating stirring needles positioned above a feeder vessel.
Figure 4B:
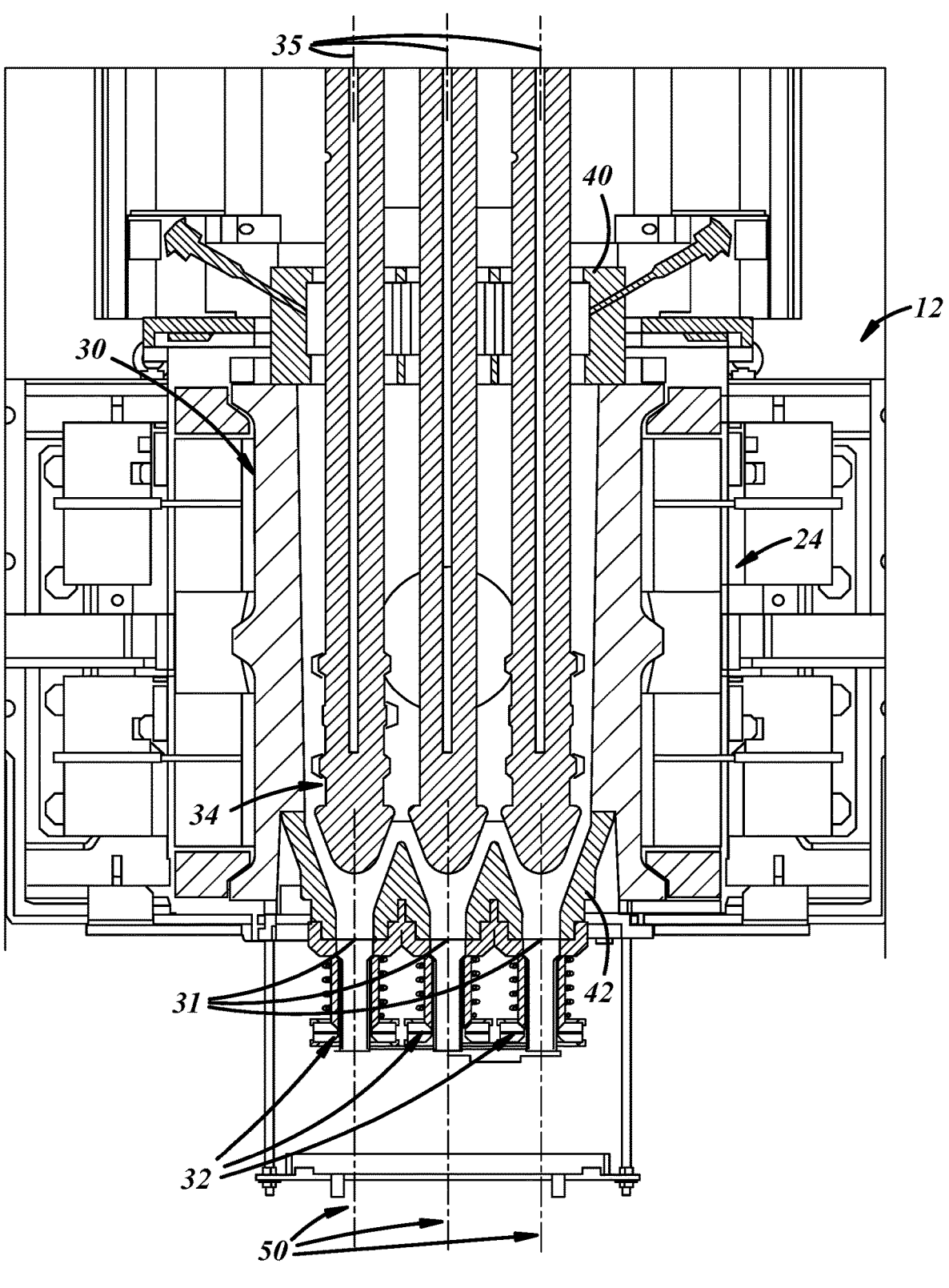
FIG. 4B is a fragmentary cross-sectional view of the system of FIG. 1, taken along line 4-4 of FIG. 3 and illustrating the stirring needles extending into the feeder vessel.

With reference now to FIGS. 4A and 4B, the feeder vessel 30 is shown carried by the housing 28 to receive the molten glass and defines a plurality of outlets 31 laterally spaced apart from one another at a lower or downstream end of the feeder vessel 30. The spout 24 also may include stirring needles 34 laterally spaced apart from one another to feed molten glass toward and out of the feeder orifices 32. The stirring needles 34 have stirrer centerlines 35 preferably coaxial with the feeder outlets 31. In other embodiments, for example, for double gob feeders, needle centerlines may not be coaxial with orifices to allow changeover to quad gob production.

With reference to FIG. 4A, unlike typical gob feeders, here the vessel 30 of the gob feeder 12 may be tubeless and may include the stirring needles 34; that is, the gob feeder 12 need not have a common plunger tube as has conventionally been the case. The feeder vessel 30 includes a main body 36 having an upper end 36a through which the stirring needles 34 extend, a lower end 36b, and a side inlet 38 between the upper and lower ends 36a,b in downstream communication with the forehearth and feeder channel 22.

The feeder vessel 30 also may include a top cover 40 carried on the upper end 36a of the main body 36 of the feeder vessel 30 and having openings through which the stirring needles 34 extend. The feeder vessel 30 further may include a bottom pan 42 that may be separate from the main body 36 of the feeder vessel 30 and carried at the lower end 36b of the main body 36. The bottom pan 42 may include an upper end 42a having a common inlet 43 and a lower end 42b having the outlets 31 laterally spaced apart from one another and with outlet centerlines 44 coaxial with the feeder orifices 32.

With reference again to FIG. 1, the gob feeder 12 also may include stirrer actuators 46 to rotate and translate the stirring needles 34. The stirring needles 34 and actuators 46 may be mounted to the secondary mounting plate 26 and/or the housing 28 by upright beams or the like. Likewise, the gob feeder 12 further may include other ancillary equipment. In one example, the feeder 12 may include a heating system (not separately shown) including one or more heaters to heat the feeder vessel 30 and the orifices 32. The heaters may be microwave heaters, resistance heaters, induction heaters, or any other equipment suitable to heat a vessel of a gob feeder. In another example, with reference to FIG. 3, the feeder 12 may include a gob cutter 48 downstream and below the orifices 32 to cut gobs from streams of molten glass exiting the orifices 32. The gob cutter 48 may include mechanical devices like shears, optical devices like lasers, fluid devices like water jets, or any other devices suitable to cut gobs from molten glass streams. FIG. 3 illustrates the gob cutter 48 in the form of gob cutting shears.

With reference again to FIG. 1, the presently disclosed system 10 includes the multiple gob feeder 12 including the feeder orifices 32 laterally spaced apart from one another and having longitudinal orifice centerlines 50 (FIG. 4B) that have orifice center distances and that establish the gob falling axes F. The stirrer centerlines 35 may be coaxial with the orifice centerlines 50 (FIG. 4B). The blank side 16 is disposed below the gob feeder 12 and includes the blank molds 18 laterally spaced apart from one another and having longitudinal blank mold centerlines 52 that have blank mold center distances that may be equal to the orifice center distances and that establish gob loading axes that correspond to the gob falling axes F of the gob feeder 12, for example, by being aligned therewith, for instance, by being coaxial therewith. The orifice centerlines 50 (FIG. 4B) and the blank mold centerlines 52 may be aligned such that they may be coaxially aligned with one another within plus or minus 30 mm, including all ranges, sub-ranges, endpoints, and values in that range. The presently disclosed system 10 is capable of loading a plurality of glass gobs directly into blank molds 18, without using chutes, deflectors, and other delivery equipment interposed between the blank side 16 and the feeder 12.

Figure 5:
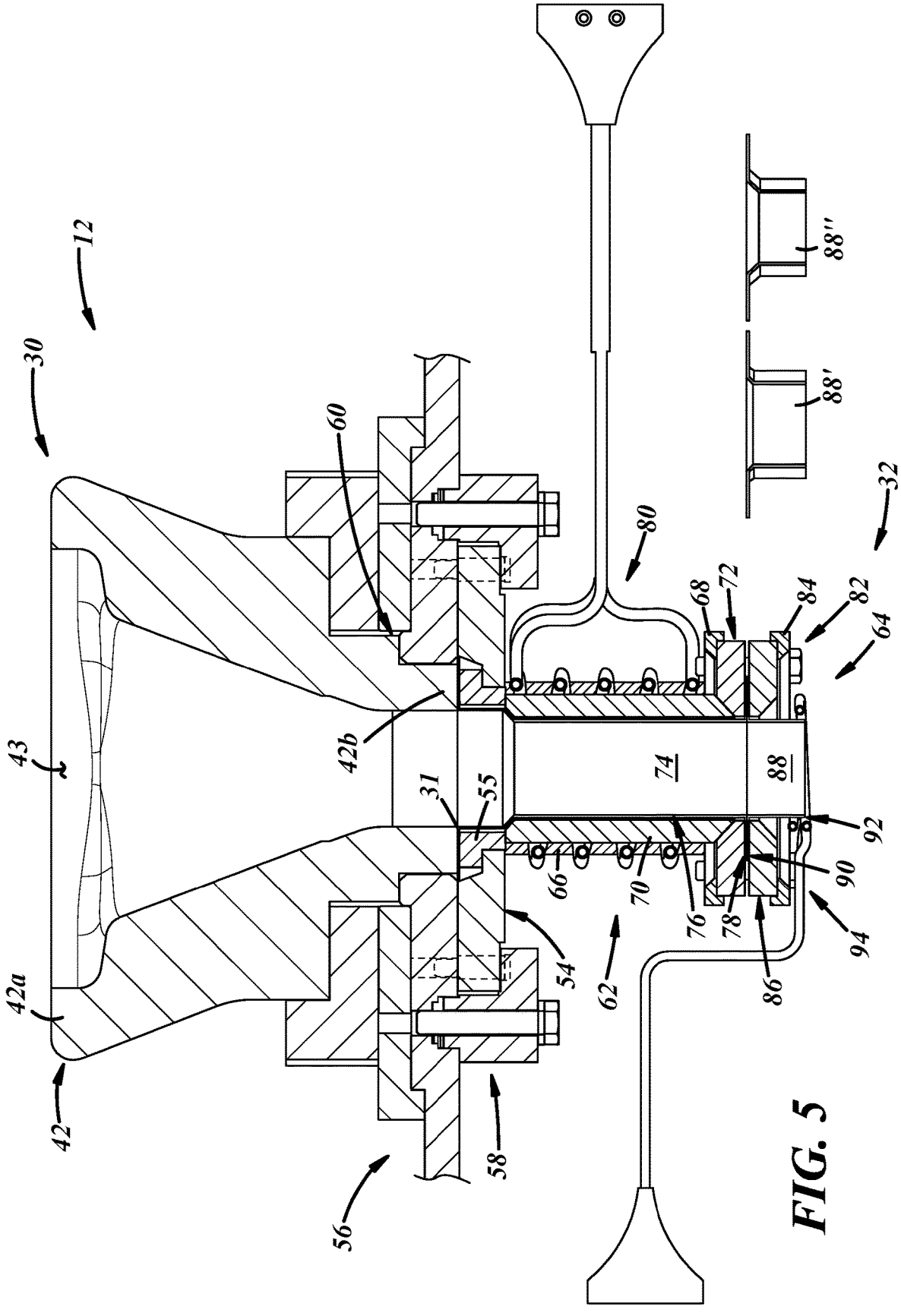
FIG. 5 is a fragmentary cross-sectional view of the system of FIG. 1, taken along line 5-5 of FIG. 3, and illustrating a feeder pan, mounting plates, and a feeder orifice including an orifice tip and additional interchangeable orifice tips.

With reference now to FIG. 5, the feeder orifices 32 may include orifice plates 54 below the bottom pan 42 of the feeder vessel 30 and mounted to one or more feeder lower plates 56, which may be coupled to the housing 28 (FIG. 1) of the feeder 12 or any other suitable structure of the feeder 12. The orifice plates 54 may be mounted to the lower plate(s) 56 by clamps 58, for example, releasable swing clamps, or in any other suitable manner. The orifice plates 54 may carry refractory collars 55 at the feeder vessel outlets 31. The feeder vessel outlets 31 may be defined by the bottom pan 42 of the vessel 30 and/or by transition conduits 60 or the like that may be integral portions of the bottom pan 42 or components separate therefrom. The feeder orifices 32 additionally may include orifice pipes 62 depending from the orifice plates 54 and orifice tips 64 depending from the orifice pipes 62.

The orifice pipes 62 may include pipe mounts that may include mounting conduits 66 having upper ends that may be welded, fastened, or otherwise coupled to the orifice plates 54, and also having lower ends. The pipe mounts also may include upper mounting flanges 68 welded, fastened, or otherwise coupled to the lower ends of the mounting conduits 66. In other embodiments, any other pipe mounts suitable for mounting the orifice pipes 62 may be used. The orifice pipes 62 also may include refractory collars 70 carried in the mounting conduits 66, and upper refractory flanges 72 at lower ends of the refractory collars 70. The orifice pipes 62 also may include pipe sleeves 74 carried in the collars 70 and including pipe conduits 76 and pipe flanges 78 at lower ends of the pipe conduits 76. The orifice pipes 62 also may include one or more orifice pipe heaters 80, for example, induction heaters carried around the mounting conduits 66 and/or the refractory collars 70 to heat the orifice pipe sleeves 74 indirectly through the mounting conduits 66 and/or the refractory collars 74. The induction heaters may include elements wound helically around the pipe conduits 66.

With continued reference to FIG. 5, the orifice tips 64 are located below the orifice pipes 62 and may include tip mounts 82 that may include lower mounting flanges 84 coupled to the upper mounting flanges 68 of the orifice pipes 62. In other embodiments, any other tip mounts suitable for mounting the orifice tips 64 may be used. The orifice tips 64 also may include lower refractory flanges 86 between the lower mounting flanges 84 and the upper refractory flanges 72, and tip sleeves 88. The tip sleeves 88 may have tip flanges 90 at upper ends of the tip sleeves 88 sandwiched between the upper and lower refractory flanges 72, 86, and tip conduits 92 extending downwardly from the tip flanges 90 and having inner diameters. The orifice tips 64 also may include one or more orifice tip heaters 94, for example, induction heaters carried around the orifice tip sleeves 88 to directly heat the sleeves 88. The induction heaters may include elements wound helically around the tip conduits 92.

The orifice pipes 62 and tips 64 may include different heaters configured to heat the orifice pipes 62 and tips 64 to different temperatures. For example, the orifice tips 64 may heated to temperatures higher than that of the orifice pipes 62 in any suitable manner. Accordingly, the feeder orifices 32 may be split induction heated orifices that facilitates rapid temperature changes of the orifices 32 for good weight control of gobs, and permits heating the orifice tips 62 to a higher temperature than the orifice pipes 64 to prevent freezing of glass at the orifice tips 64 and concomitant undesired reduction in gob diameters at the orifice tips 64. As shown in FIG. 5, the tip sleeves 88 include a plurality of interchangeable tip sleeves 88, 88', 88" with conduits of differently sized inner diameters.

Figure 6:
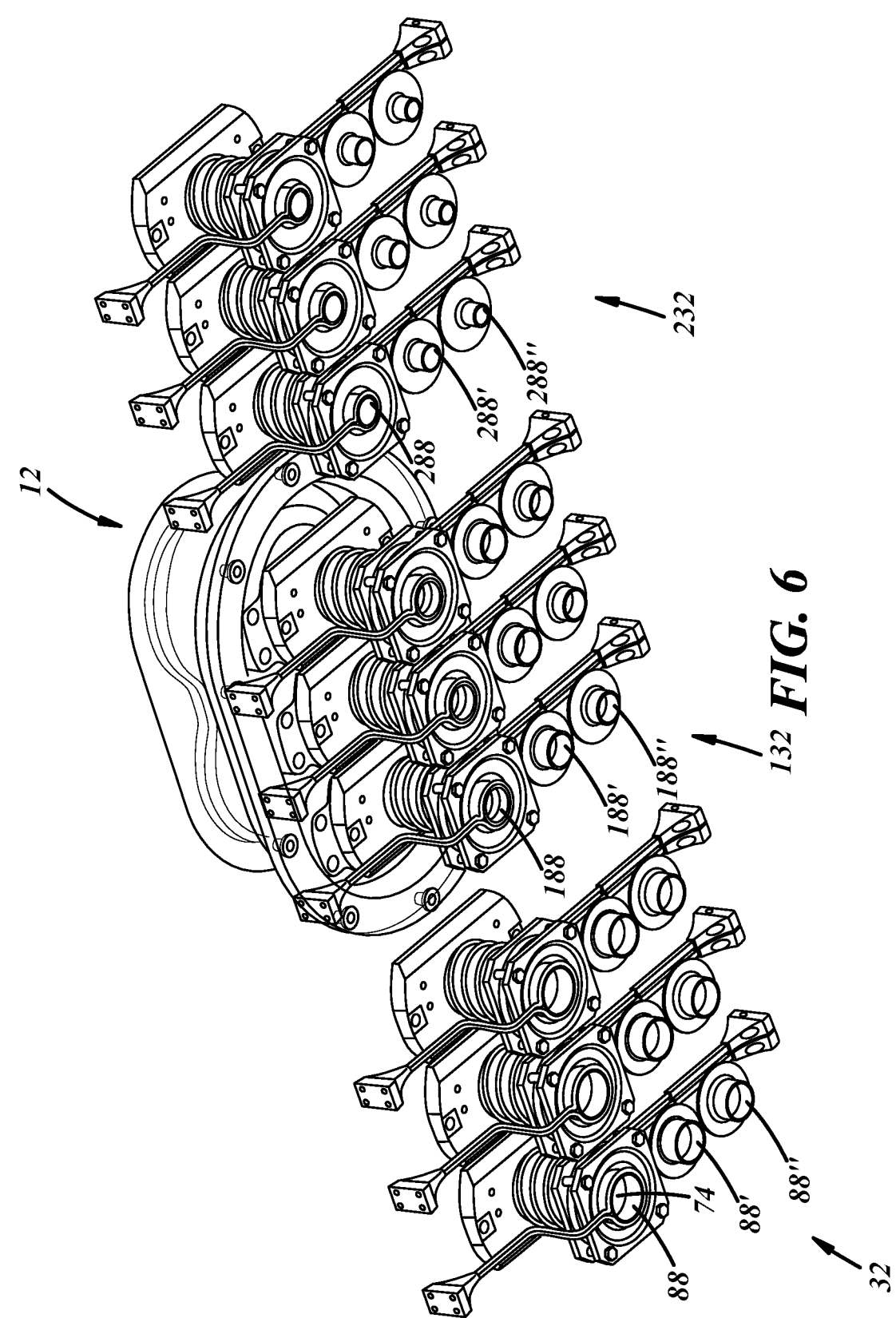
FIG. 6 is a fragmentary perspective view of a lower portion of the system of FIG. 1, illustrating nine differently sized interchangeable orifice tips.

With reference now to in FIG. 6, three sets of orifices 32, 132, 232 are shown, each with a pipe sleeve 74 (visible with respect to the first set of orifices 32), and nine differently sized interchangeable tip sleeves 88, 88', 88", 188, 188', 188", 288, 288', 288". The pipe sleeves 74 may be of identical size across all three sets of orifices 32, 132, 232, or the sets may include different pipe sleeves of different sizes, specifically differently sized inner diameters. Accordingly, with nine different orifice tip sleeves and three different pipe sleeves, a total of 27 different orifice tips are shown in FIG. 6. The orifice pipes and/or tips, particularly the sleeves, may be composed of platinum, platinum alloys (rhodium and platinum engineered materials like FKS for example), powder metallurgical, dispersion strengthened, ferritic iron-chromium-aluminum alloy like APM for example, or any other materials suitable for use as orifice components. Those of ordinary skill in the art would recognize that the presently disclosed feeder and feeder orifices could be adapted for use with a single feeder outlet and a single feeder orifice, or a double or quadruple feeder.

Also disclosed is a method of loading one or more glass gobs into a glass forming machine. The method includes producing one or more glass gobs falling from one or more corresponding orifices—the orifices being laterally spaced apart from one another if more than one orifice is present—and along respective gob falling axes. The orifices have centerlines with orifice center distances. The one or more glass gobs are received into one or more corresponding blank molds, each of which has a blank mold centerline establishing a gob loading axis that corresponds to its corresponding gob falling axis. The blank molds have centerlines with blank mold center distances that may be equal to the orifice center distances. The step of producing the glass gob(s) may include stirring molten glass in a tubeless gob feeder using stirring needles laterally spaced apart from one another, and may further include heating a column of molten glass with an orifice pipe heater configured to heat an upper portion of the column of molten glass and with an orifice tip heater configured to heat a lower portion of the column of molten glass to a temperature higher than that of the upper portion of the column of molten glass. For example, the orifice pipe induction heater may be used to heat the upper portion of the column of molten glass, and the orifice tip induction heater may be used to heat the lower portion of the column of molten glass. The heating step may include inductively heating an orifice pipe indirectly through a refractory collar and inductively heating an orifice tip directly. In other embodiments, the step of producing the glass gob(s) may include heating the orifice tip(s) to a higher temperature than the orifice pipe(s). In either case of heating the tip(s) or the lower portion(s) of the column(s) of molten glass, the goal is to prevent freezing of glass at the tip(s) and concomitant undesired reduction in gob diameter at the tip(s).

A glass manufacturing system may include a gob feeder to produce falling gobs that fall along a glass gob loading axis, and a glass forming machine having a machine frame, and establishing a glass gob loading axis, a traversable blank side including a blank mold configured to form glass gobs into parisons and having a corresponding blank mold vertical axis, and a mold carriage movably carried on the machine frame and coupled to the traversable blank side to linearly translate the traversable blank side toward the glass gob loading axis to align the blank mold vertical axis with the glass gob loading axis and to linearly translate the traversable blank side away from the glass gob loading axis. The traversable blank mold section is movable below the gob feeder so that the blank mold receives the falling gobs directly from the gob feeder. Those of ordinary skill in the art would recognize that the traversable blank side may include multiple blank molds and blank mold axes, wherein the mold carriage movably carries the traversable blank side to translate it toward and away from corresponding glass gob loading axes. In a preferred embodiment, such a glass forming machine may be provided as disclosed in U.S. application Ser. No. 17/981,139, filed on Nov. 4, 2022, assigned to the assignee hereof, and the entire contents of which is incorporated herein by reference.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A glass feeding and forming system, comprising:
a multiple gob feeder including feeder orifices laterally spaced apart from one another and having longitudinal orifice centerlines establishing gob falling axes, and including
  orifice pipes including orifice pipe sleeves and orifice pipe heaters to heat the orifice pipes, and
  orifice tips including orifice tip sleeves and orifice tip heaters to heat the orifice tips,
  wherein the orifice tip heaters and the orifice pipe heaters are controlled independently of one another; and
a blank molding station disposed below the gob feeder and including blank molds laterally spaced apart from one another and having longitudinal blank mold centerlines establishing gob loading axes corresponding to the gob falling axes of the gob feeder.

2. The system of claim 1, wherein no gob delivery equipment is interposed between the gob feeder and the blank molding station.

3. The system of claim 1, wherein the gob feeder includes a tubeless housing and stirring needles having stirrer centerlines coaxial with the longitudinal orifice centerlines.

4. The system of claim 3, wherein the gob feeder has no plunger tube mounted therein.

5. The system of claim 1, wherein the feeder orifices are split induction-heated feeder orifices that include
  the orifice pipe heaters including orifice pipe induction heaters around the orifice pipes,
  the orifice tips in downstream communication with and separate from the orifice pipes, and the orifice tip heaters including orifice tip induction heaters around the orifice tips and separate from the orifice pipe induction heaters.

6. The system of claim 1, wherein the orifice tip heaters are configured to heat the orifice tips to temperatures higher than that of the orifice pipes.

7. The system of claim 1, wherein the gob feeder also includes a housing, and a feeder vessel carried by the housing and including a main body including an upper end through which stirring needles extend, a lower end, and a side inlet between the upper and lower ends, and a bottom pan separate from the main body of the feeder vessel and carried at the lower end of the feeder vessel and including an upper end having a common inlet and a lower end having outlets laterally spaced apart from one another and with outlet centerlines coaxial with the longitudinal orifice centerlines of the feeder orifices.

8. The system of claim 1, wherein the blank molds have longitudinal blank mold centerlines that have blank mold center distances that are equal to center distances of the longitudinal orifice centerlines.

9. The system of claim 8, wherein the longitudinal blank mold centerlines establish gob loading axes that are coaxial with the gob falling axes of the gob feeder.

10. A glass feeding and forming system, comprising:
a multiple gob feeder including feeder orifices laterally spaced apart from one another and having longitudinal orifice centerlines establishing gob falling axes; and
a blank molding station disposed below the gob feeder and including blank molds laterally spaced apart from one another and having longitudinal blank mold centerlines establishing gob loading axes corresponding to the gob falling axes of the gob feeder
wherein the multiple gob feeder includes a feeder vessel including outlets, and wherein the feeder orifices are disposed below the outlets of the feeder vessel and include
    orifice pipes including
        pipe mounts including
            mounting conduits having upper ends and lower ends,
            upper mounting flanges coupled to the lower ends of the mounting conduits,
            refractory collars carried in the mounting conduits,
            upper refractory flanges at lower ends of the refractory collars, and
            pipe sleeves carried in the refractory collars and having pipe conduits and pipe flanges at lower ends of the pipe sleeves, and
    orifice tips below the orifice pipes and including
        tip mounts including
            lower mounting flanges coupled to the upper mounting flanges of the orifice pipes,
            lower refractory flanges between the lower mounting flanges and the upper refractory flanges, and
            tip sleeves having tip flanges at upper ends of the tip sleeves sandwiched between the upper and lower refractory flanges and tip conduits extending downwardly from the tip flanges and having inner diameters.

11. The system of claim 10, wherein the tip sleeves include a plurality of interchangeable tip sleeves with conduits of differently sized inner diameters.

12. The system of claim 10, wherein the orifice pipes and tips also include different heaters to heat the orifice pipes and tips to different temperatures.

13. The system of claim 12, wherein the different heaters are configured to heat the orifice tips to temperatures higher than that of the orifice pipes.

14. A method of loading glass gobs into a blank molding station of a glass forming machine, comprising:
producing glass gobs falling from orifices laterally spaced apart from one another and along falling gob axes and including
    orifice pipes including orifice pipe sleeves and orifice pipe heaters to heat the orifice pipes, and
    orifice tips including orifice tip sleeves and orifice tip heaters to heat the orifice tips,
    wherein the orifice tip heaters and the orifice pipe heaters are controlled independently of one another; and
receiving the glass gobs into blank molds laterally spaced apart from one another and having blank mold centerlines corresponding to the falling gob axes.

15. The method of claim 14, wherein the producing step includes stirring molten glass in a tubeless gob feeder using stirring needles laterally spaced apart from one another.

16. The method of claim 14, wherein the producing step includes heating a column of molten glass with an orifice pipe heater configured to heat an upper portion of the column of molten glass and with an orifice tip heater configured to heat a lower portion of the column of molten glass to a temperature higher than that of the upper portion of the column of molten glass.

17. The method of claim 16, wherein the heating step includes inductively heating an orifice pipe sleeve indirectly through a refractory collar and inductively heating an orifice tip sleeve directly.

18. A glass feeding and forming system, comprising:
a multiple gob feeder including feeder orifices laterally spaced apart from one another and having longitudinal orifice centerlines establishing gob falling axes; and
a blank molding station disposed below the gob feeder and including blank molds laterally spaced apart from one another and having longitudinal blank mold centerlines establishing gob loading axes corresponding to the gob falling axes of the gob feeder
wherein the multiple gob feeder includes a feeder vessel including outlets, and wherein the feeder orifices are disposed below the outlets of the feeder vessel and each include
    an orifice pipe including
        an orifice pipe sleeve,
        a refractory collar around the orifice pipe sleeve, and
        an orifice pipe heater to heat the orifice pipe, and
    an orifice tip below the orifice pipe and including
        an orifice tip sleeve, and
        an orifice tip heater to heat the orifice tip.

19. The glass feeding and forming system of claim 18, wherein
each orifice pipe also includes
    an upper refractory flange at a lower end of the refractory collar, and
    the orifice pipe sleeve carried in the refractory collar and having a pipe conduit and a pipe flange, and
each orifice tip also includes
    a lower refractory flange, and
    a tip sleeve carried in the lower refractory flange and having a tip flange at an upper end of the tip sleeve sandwiched between the upper and lower refractory flanges and a tip conduit extending downwardly from the tip flange.

* * * * *